United States Patent [19]

Onuki

[11] Patent Number: 5,028,128
[45] Date of Patent: Jul. 2, 1991

[54] IMAGE DISPLAY APPARATUS

[75] Inventor: Kazuhiko Onuki, Tokyo, Japan

[73] Assignee: Canon Kabushiki Kaisha, Tokyo, Japan

[21] Appl. No.: 442,000

[22] Filed: Nov. 28, 1989

[30] Foreign Application Priority Data

Dec. 1, 1988 [JP] Japan .............. 63-155601[U]

[51] Int. Cl.$^5$ .................. G03B 27/52; G03B 21/28
[52] U.S. Cl. ............................. 353/122; 353/82; 355/44; 355/45; 355/41
[58] Field of Search .............. 353/25, 26 R, 26 A, 353/27 R, 27 A, 82; 355/44, 45, 47, 41, 57; 358/483, 487, 471, 482

[56] References Cited

U.S. PATENT DOCUMENTS

| 4,339,182 | 1/1982 | Ueda et al. ............... 353/27 R |
| 4,367,033 | 1/1983 | Watanabe .................. 355/45 |
| 4,564,276 | 1/1986 | Hofmann et al. ............ 353/77 |
| 4,712,142 | 12/1987 | Tomita et al. ............. 358/468 |
| 4,751,553 | 6/1988 | Fukasawa . |
| 4,800,413 | 1/1989 | Ito et al. ................ 355/45 |
| 4,807,041 | 2/1989 | Kishi et al. .............. 358/452 |
| 4,873,552 | 10/1989 | Otsuki ..................... 355/45 |
| 4,879,572 | 11/1989 | Onuki et al. . |
| 4,881,099 | 11/1989 | Onuki et al. ............... 355/45 |
| 4,894,681 | 1/1990 | Watanabe et al. ........... 353/27 R |
| 4,947,213 | 8/1990 | Shinji Murata et al. . |

FOREIGN PATENT DOCUMENTS 55-130531 9/1980 Japan .

Primary Examiner—Thomas B. Will
Assistant Examiner—William C. Dowling
Attorney, Agent, or Firm—Fitzpatrick, Cella, Harper & Scinto

[57] ABSTRACT

An image display apparatus has an optical system including a movable mirror for projecting the image of an image bearing member, a screen for displaying the image projected by the optical system, an image sensor fixed in the vicinity of the screen but outside the image projecting optical path toward the screen, and a moving mechanism for moving the mirror between a display position for projecting the image onto the screen and a reading position for projecting the image onto the image sensor.

9 Claims, 7 Drawing Sheets

IMAGE DISPLAY APPARATUS

BACKGROUND OF THE INVENTION

1. Field of the Invention

The present invention relates to an image display apparatus for projecting an image of an image bearing member such as a film onto a screen, and reading thus displayed image with an image sensor for obtaining image signals.

2. Related Background Art

Figure 7:
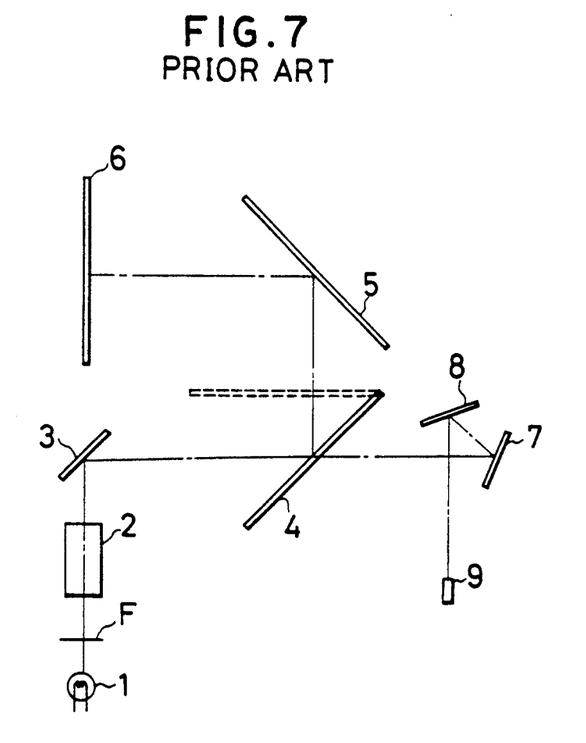
FIG. 7 is a schematic view of a conventional image display apparatus.

In the conventional image display/reading apparatus, a switching mirror has been employed for selecting either a display optical path for projecting the film image onto a display screen, or a reading optical path for projecting said image onto a sensor array (image sensor). More specifically, as shown in FIG. 7, the image of the microfilm F illuminated by a lamp 1 is projected by a projection lens 2 and is reflected by a scan mirror 3, and there is provided a display optical path for image projection onto a screen 6 through a switchable mirror 4 in the solid-lined position and a fixed mirror 5, and a reading optical path leading to a sensor array 9 through fixed mirrors 7, 8, with the switching mirror 4 in the broken-lined position outside the optical path.

In such conventional structure, however, the display optical path and the reading optical path are completely separate after the switching mirror 4, thus requiring a large space and an elevated cost due to the presence of mirrors as explained above. In addition there is required delicate adjustment of mirrors for matching the center of the display optical path with that of the reading optical path, so that the image on the screen 6 becomes often displaced from the image on the sensor array.

SUMMARY OF THE INVENTION

In consideration of the foregoing, the object of the present invention is to provide an image display apparatus which is compact in size and enables easy assembly and easy adjustment of the component parts.

The above-mentioned object can be attained, according to the present invention, by an image display apparatus in which an image sensor for reading the image is positioned in the vicinity of the screen but outside the display optical path, whereby the display optical path and the reading optical path can be positioned next to each other with a common optical system. Thus the apparatus can be made compact and inexpensive, and the component parts can be easily adjusted with high precision.

DESCRIPTION OF THE PREFERRED EMBODIMENTS

In the following there will be explained a first embodiment of the present invention, with reference to FIG. 1.

Figure 1:
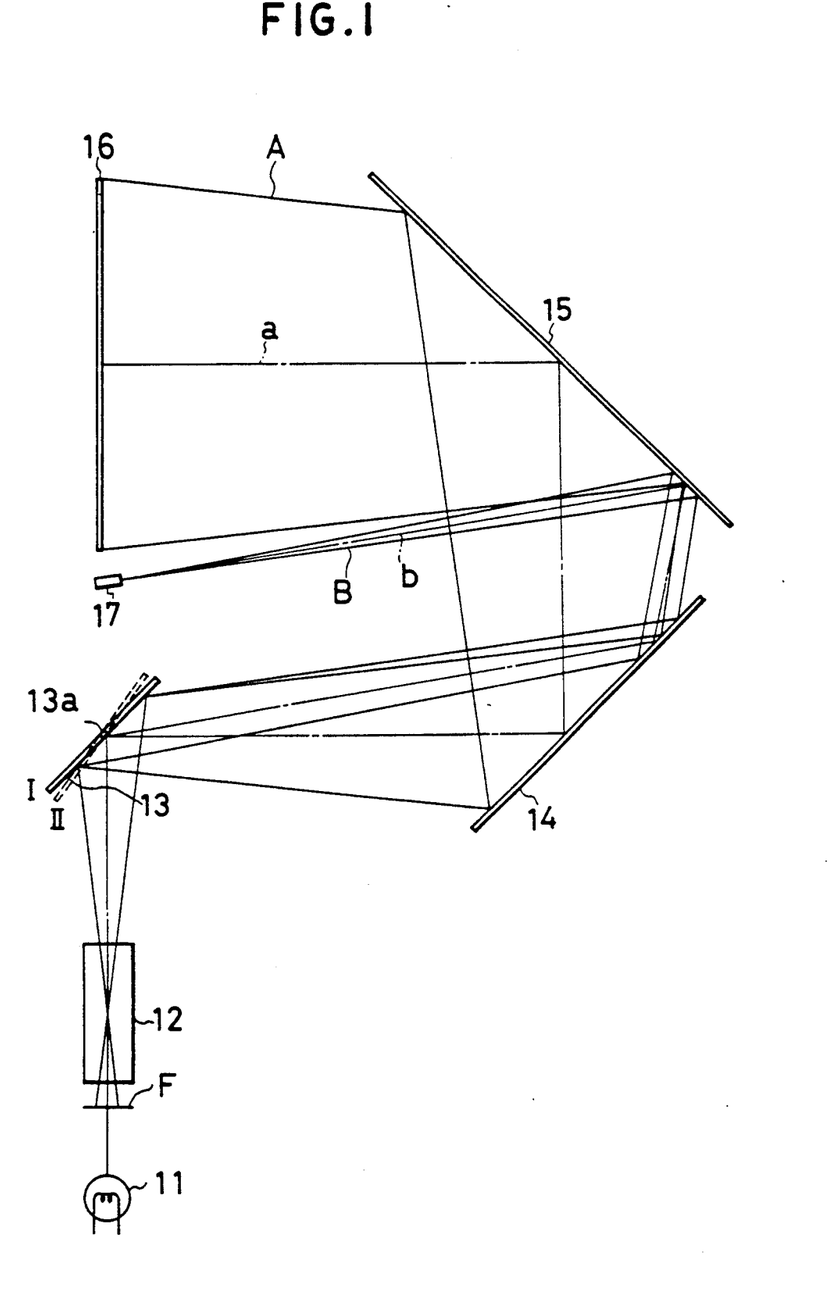
FIG. 1 is a schematic view of a first embodiment of the image display apparatus of the present invention.

In FIG. 1 there are shown a microfilm F; a lamp 11 for illuminating said microfilm F; a projection lens 12 for enlarging the image on the microfilm F; a rotary mirror 13 for effecting a rotary scanning motion about a shaft 13a, positioned on the optical path behind said projection lens 12; fixed mirrors 14, 15 positioned with a mutually substantially perpendicular relationship on the optical path behind said rotary mirror 13; a display screen 16; and a sensor array (line image sensor) 17 for reading the image of the microfilm F for conversion into electrical signals, positioned in the vicinity of the lower edge of said screen 16. The shaft 13a is moved by a motor for displacing the mirror 13 between a display position and a reading position. There are shown an optical axis a of a display optical path A formed by mirrors 13, 14 and 15, and an optical axis b of a reading optical path B formed by said mirrors 13, 14 and 15 when the mirror 13 is rotated from the solid-lined position. The optical path length from the microfilm F to the screen 16 along the optical axis a is selected equal to that from the microfilm F to the sensor array 17 along the optical axis b. The display optical path A or the reading optical path B can be selectively formed by the rotation of the rotary mirror 13.

The sensor array 17 is positioned outside the display optical path A, in the vicinity of the lower edge of the screen 16, and substantially parallel to said lower edge of the screen 16.

In the above-explained embodiment, the illuminating light beam from the lamp 11 is concentrated by an unrepresented condensing system (condenser lens) and illuminates the microfilm F. Thus the image of the microfilm F is enlarged by the projection lens 12 and is reflected by the rotary mirror 13. In the normal state in which the operator watches the image on the screen 16, said rotary mirror 13 is positioned in the solid-lined display position I, so that the image of the microfilm F is reflected by the fixed mirrors 14, 15 and projected on the screen 16.

In case of printing the image projected on the screen 16, an unrepresented printer button is depressed, whereby the rotary mirror 13 rotates anticlockwise about the shaft 13a, and starts clockwise rotation upon reaching the broken-line reading position II. At the same time the light reflected by the fixed mirrors 14, 15 enters the sensor array 17 thereby initiating the image reading. Since the image signals obtained by the sensor array 17 are in the mirror image or reversed relationship with the image on the screen 16, said image signals are stored in an unrepresented memory, then so processed as to obtain a normal image, and further processed electrically for supply to an unrepresented printer such as a laser beam printer to obtain a print.

Upon completion of said image reading, the rotary mirror 13 stops at the solid-line initial position I, whereby the image of the microfilm F is again projected on the screen 16.

The above-explained structure allows use of most of the reading optical path in common with the display optical path, so that the apparatus can be significantly compactized. Also the cost can be reduced since the switching mirror which is inserted into the optical path and retracted therefrom can be dispensed with.

Furthermore, since the mirrors are used in common for the display optical path and the reading optical path, the positioning of the image on the microfilm F can be made by the adjustment of said mirrors, within a short time and with an improved precision.

Figure 2:
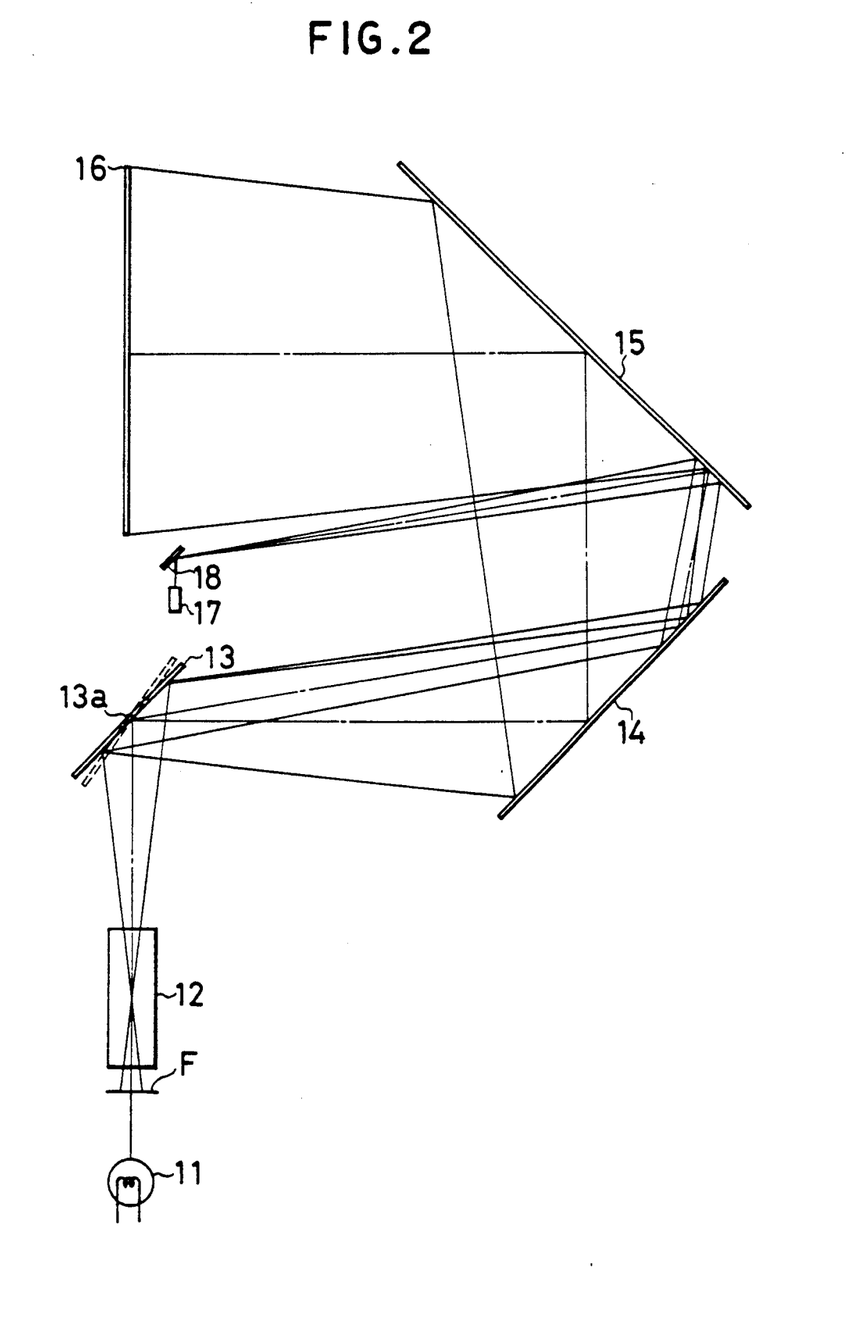
FIG. 2 is a schematic view of a second embodiment of the present invention.

FIG. 2 shows a second embodiment of the present invention, wherein same components as those in the first embodiment are represented by same numbers and will not be explained further.

In the present embodiment, a fixed mirror 18 is provided immediately in front of the sensor array 17 for guiding the light, which is reflected by the fixed mirrors 14, 15, to the sensor array 17. Other structures are identical with those in the first embodiment. The optical path length from the film F to the screen 16 is selected equal to that from the film F to the sensor array 17.

In the projection system of the present embodiment, the image read by the sensor array is not the mirror image but the same image as displayed on the screen 16, so that the image signals can be directly stored in the memory.

Figure 3:
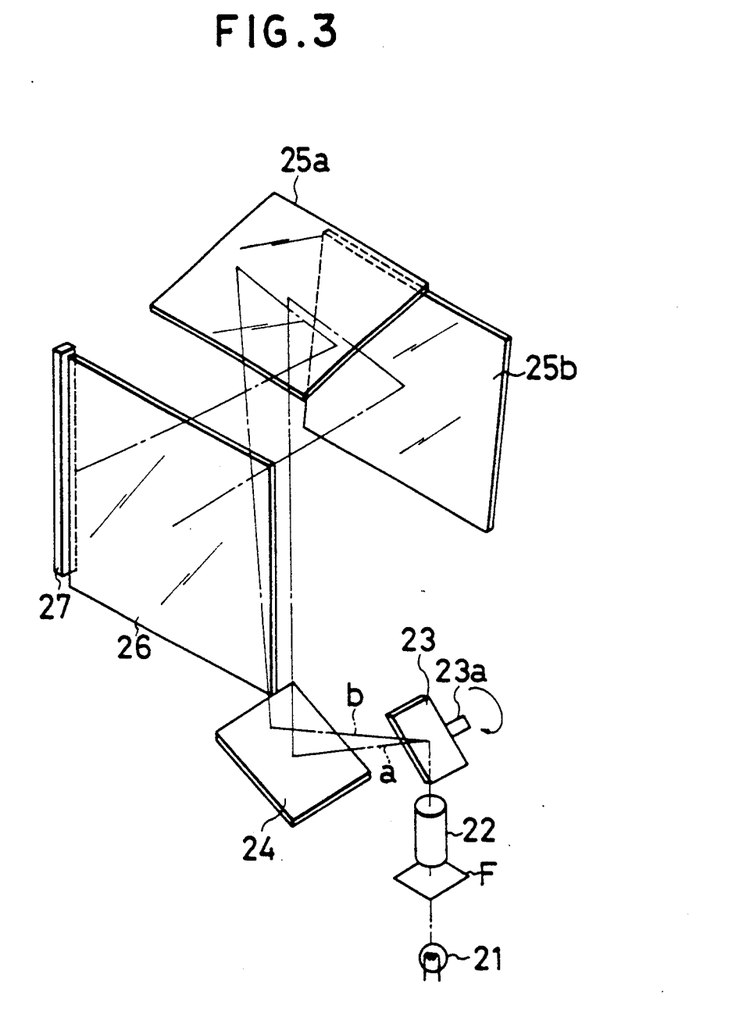
FIG. 3 is a schematic view of a third embodiment of the present invention.

FIG. 3 shows a third embodiment of the present invention, wherein the microfilm F is illuminated by a lamp 21. The image of the microfilm F is enlarged by a projection lens 22 and is reflected by a rotary mirror 23 having a rotary shaft 23a. Said rotary mirror 23 is positioned downwards to select the optical axis a in the image display state, whereby the image of the microfilm F is reflected upwards by an intermediate fixed mirror 24 and projected onto a screen 26 by means of mutually crossing fixed mirrors 25a, 25b. A sensor array 27 is provided along an edge of said screen 26.

In case of reading the image of the microfilm F with said sensor array 27, the rotary mirror 23 is rotated about the shaft 23a as indicated by an arrow to shift the optical axis from a to b, whereby the image of the microfilm F is projected in continuous manner on the sensor array 27. The process after image reading is the same as in the first embodiment.

Figure 4:
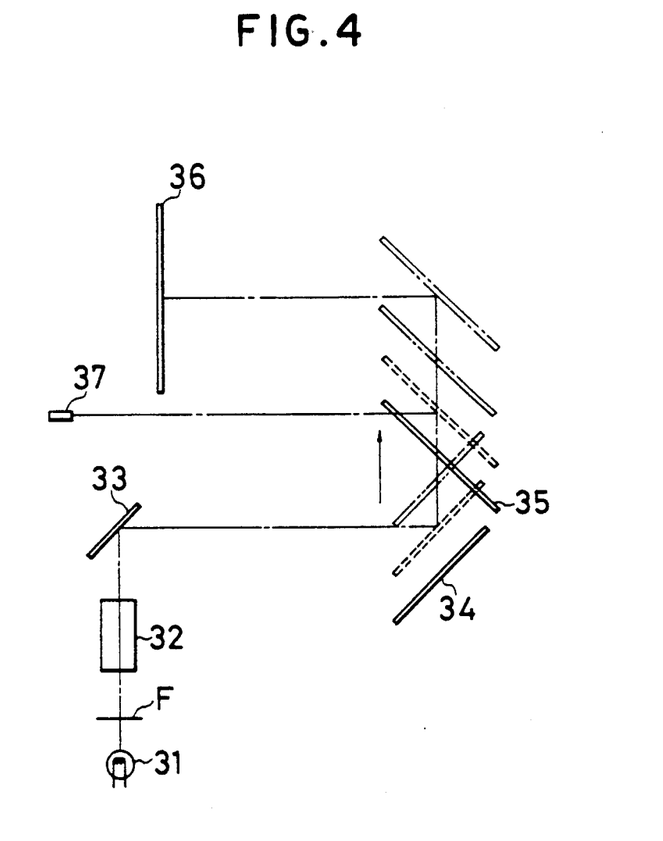
FIG. 4 is a schematic view of a fourth embodiment of the present invention.

FIG. 4 shows a fourth embodiment of the present invention.

In the present embodiment, the microfilm F is illuminated by a lamp 31, and the image of said microfilm F is enlarged by a projection lens 32, then reflected by a fixed mirror 33, and projected onto a screen 36 or read by a sensor array 37 provided at the lower edge of said screen 36, by means of mutually orthogonal movable mirrors 34, 35 which are rendered movable in the vertical direction.

In case of reading the image with the sensor array 37 with this structure, the movable mirrors 34, 35 integrally move from the solid-line position as indicated by an arrow, then go through the broken-line position and reach the double-dot chain-line position, where the image reading is terminated. This mirror movement is known as 90° mirror movement method.

Thereafter the movable mirror 34 moves to the broken-line position while the movable mirror 35 moves separately to the single-dot chain-line position, whereby the image of the microfilm F is projected onto the screen 36. The process after the image reading is the same as in the first embodiment.

In the foregoing first, second and fourth embodiments, the sensor array is positioned along the lower edge of the screen, but it may also be provided along the upper edge of the screen.

Figure 5:
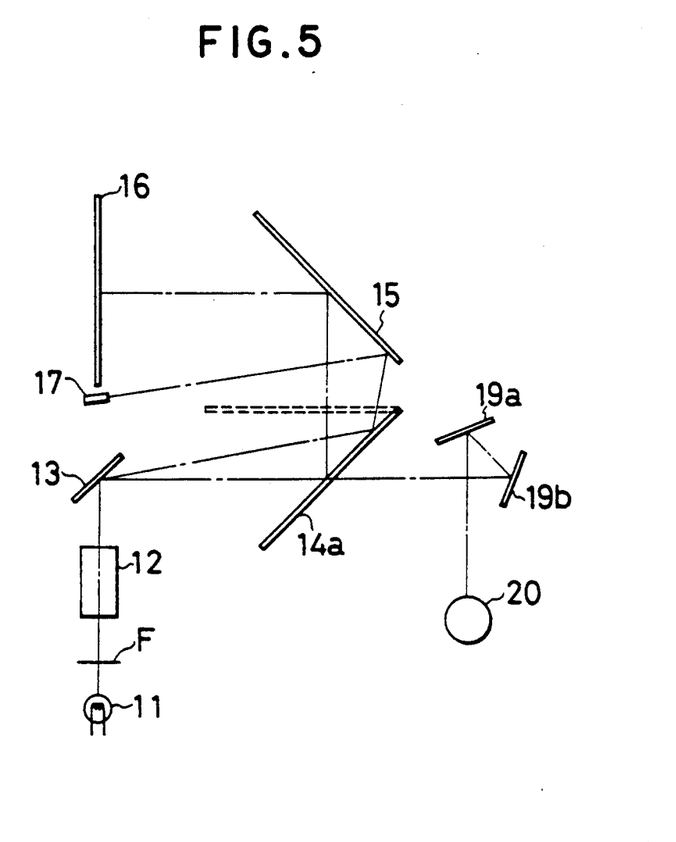
FIG. 5 is a schematic view of a fifth embodiment of the present invention.

FIG. 5 shows a fifth embodiment of the present invention.

The present embodiment is a variation of the first embodiment, wherein a path switching mirror 14a which is movable between a solid-line position and a broken-lined position, is placed at the solid-line position in case of projecting the image of the microfilm F onto the screen 16 or the sensor array 17.

Behind the switching mirror 14a, there is provided fixed mirrors 19a, 19b with a mutual angle of 45° and a photosensitive drum 20.

When the switching mirror 14a is retracted to the broken-line position outside the optical path, the image of the microfilm F is projected onto the photosensitive drum 20 by means of the mirrors 13, 19a, 19b, and said photosensitive drum 20 is exposed to the image of the microfilm F in scanning manner, by rotating said drum 20 in synchronization with the rotation of the mirror 13.

In this case, the image projected onto the photosensitive drum 20 is electrophotographically developed and transferred onto a recording sheet.

On the other hand, in case the image is projected onto the sensor array 17, the image read thereby can be transmitted by a facsimile system.

Figure 6:
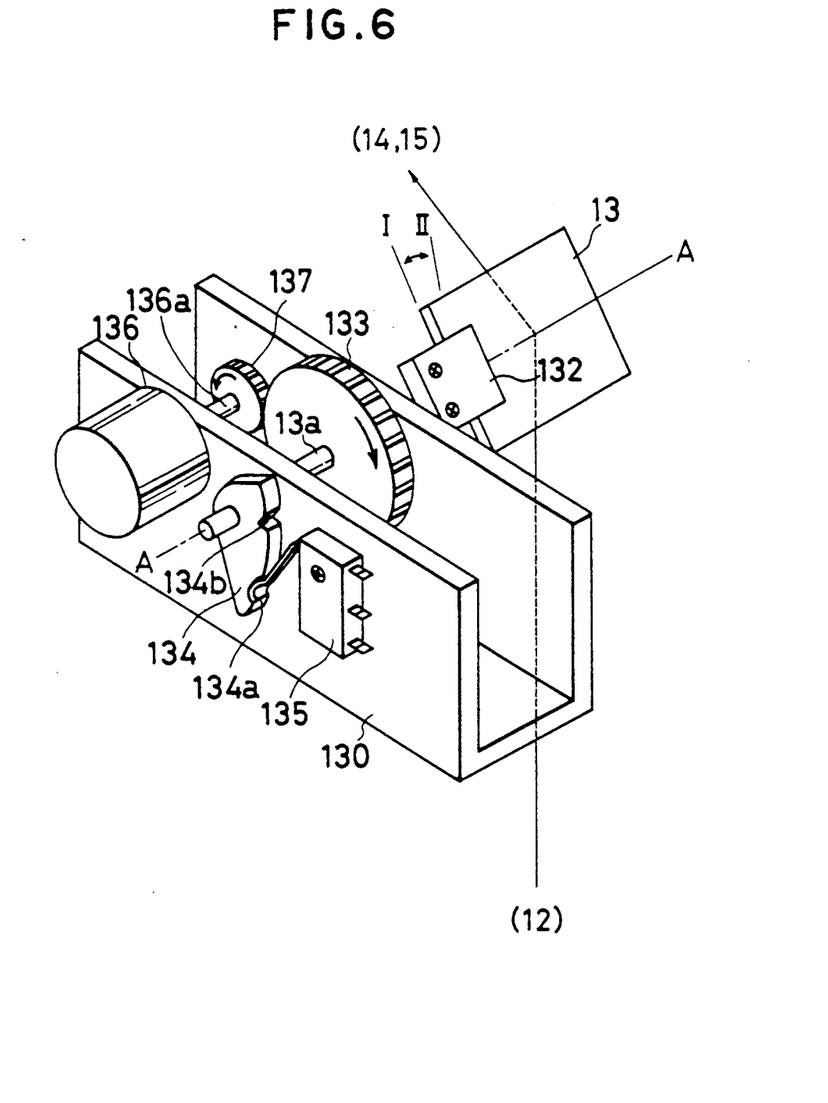
FIG. 6 is a perspective view of a mirror rotating mechanism.

FIG. 6 shows an example of the rotating mechanism for the mirror 13, wherein provided are a support member 130 fixed on the main body; a shaft 13a rotatably supported by said support member 130; and a mirror holder 132 secured to the end of the shaft 13a. The rotary mirror 13 is fixed on said holder in such a manner that the axis A—A of the shaft 13a lies on the reflective plane of the mirror 13 whereby the mirror 13 rotates about said axis A—A.

There is further shown a gear 133 fixed on said shaft 13a; a cam plate 134 fixed on the other end of the shaft 13a; a microswitch 135 provided on a predetermined position on the lateral side of the support member 130 so as to engage with said cam plate 134; a reversible motor 136 mounted on the lateral side of the support member; and a gear fixed on the rotary shaft 136a of said motor and engaging with the gear 133 of the shaft 13a.

Normally the rotary mirror 13 is maintained at an angular position I for the image display as shown in FIG. 6, in which the actuator of the microswitch 135 engages with a first recess 134a of the cam plate 134.

When a print signal is supplied to a control circuit by the actuation of the print button in this state, the motor 136 is energized in the forward direction, whereby the forward rotation of the gear 137 is transmitted, through the gear 133 and the shaft 13a, to the rotary mirror 13, thus rotating the mirror 13 about the axis A from the solid-line display position in FIG. 1 to the broken-line reading position. When the mirror 13 reaches said reading position, the actuator of the microswitch 135 engages with a second recess 134b of the cam plate 134 integrally rotating with the shaft 13a whereby the motor 136 is deactivated and stopped.

Subsequently the motor 136 is energized in the reverse direction whereby the mirror 13 returns to the solid-line initial display position where the actuator of the microswitch 135 engages with the first recess 134 of the cam plate 134 as shown in FIG. 6.

During the rotation of the mirror 13 at a predetermined angular velocity from the reading position to the display position, the image of the microfilm F is projected onto the sensor array 17, whereby said sensor array reads said image and generates the corresponding image signals.

As explained in the foregoing, the sensor array for reading the filmed image is positioned close to the screen, whereby the apparatus is compactized and reduced in cost, and the adjustment of the optical axis is facilitated and can be achieved with improved precision.

Also the image bearing member is not limited to the microfilm but can be a document, a book or the like.

I claim:

1. An image display apparatus, comprising:
   optical means for projecting an image of an image bearing member, said optical means including at least first and second mirrors, with said first mirror being rotatable and said second mirror being fixed;
   a screen for displaying the image projected along an image projecting optical path by said optical means;
   an image sensor provided in the vicinity of said screen and fixed outside the image projecting optical path to said screen; and
   moving means for moving said first mirror between a display position for projecting the image onto said screen and a reading position for projecting the image on said image sensor, wherein
   light reflected by said first and second mirror is projected onto said screen when said first mirror is placed at the display position and onto said image sensor when said first mirror placed at the reading position, with said first mirror being rotated at a constant speed by said moving means and the image being read by said image sensor during rotation of said first mirror.

2. An apparatus according to claim 1, wherein said optical means uses a number of mirrors for projecting the image onto said screen that is different from the number of mirrors for projecting the image onto said image sensor.

3. An apparatus according to claim 1, wherein said optical means uses a number of mirrors for projecting the image onto said screen that is the same as the number of mirrors for projecting the image onto said image sensor.

4. An apparatus according to claim 1, wherein said optical means comprises a projection lens, and said first mirror is positioned opposite to said projection lens.

5. An apparatus according to claim 1, wherein said image sensor is positioned under said screen.

6. An apparatus according to claim 1, wherein said image sensor is positioned at a lateral side of said screen.

7. An apparatus according to claim 1, wherein said image sensor is composed of a linear image sensor, and the image is scanned by said image sensor by the movement of said first mirror.

8. An image reading apparatus, comprising:
   optical means for projecting the image of a film, said optical means including a projection lens and a plurality of mirrors, with one of said mirrors being rotatable;
   a screen for displaying the image projected by said optical means;
   a linear image sensor fixed in the vicinity of said screen but outside of an image projecting optical path toward said screen; and
   drive means for rotating said rotatable mirror between a first position for guiding the image to said screen and a second position for guiding the image to said image sensor, wherein
   the image of the film is projected onto said screen by said projection lens and said plurality of mirrors when said rotatable mirror is placed at a first position,
   the image of the film is projected by said projection lens and said plurality of mirrors onto said image sensor when said rotatable mirror is placed at a second position, and
   said rotatable mirror is rotated at a predetermined speed, with the image of the film being read by said image sensor during rotation of said rotatable mirror.

9. A film reader-printer, comprising:
   a projection lens;
   a rotatable first mirror for reflecting light from said projection lens;
   a screen for observing the image recorded in the film;
   first optical means for guiding light reflected by said first mirror to said screen, with said first optical means including at least one fixed second mirror, the image of the film being projected on said screen by said projection lens, said first mirror and said first optical means;
   image sensor array means disposed in the vicinity of said screen outside of an image projecting light path to said screen and within a reflected light path of said second mirror;
   a photosensitive member;
   second optical means for guiding light from said projection lens to said photosensitive member, with the image of the film being projected onto said photosensitive member by said projection lens, said first mirror and said second optical means; and
   drive means for rotating said first mirror for causing the image of the film to be scanned by either one of said image sensor array means of said photosensitive member, with the usage of the film being scanned by said image sensor array means during rotation of said first mirror.

* * * * *

UNITED STATES PATENT AND TRADEMARK OFFICE
CERTIFICATE OF CORRECTION

PATENT NO. : 5,028,128

DATED : July 2, 1991

INVENTOR(S) : Kazuhiko Onuki

It is certified that error appears in the above-identified patent and that said Letters Patent is hereby corrected as shown below:

ON THE TITLE PAGE:

[56] REFERENCES CITED:

U.S. PATENT DOCUMENTS, "4,339,182 1/1982 Ueda et al." should read --4,339,182 7/1982 Ueda et al.--.

COLUMN 3:

Line 37, "shaft 23 aas" should read --shaft 23a as--.

COLUMN 6:

Line 50, "means of" should read --means and--.

Line 51, "usage" should read --image--.

Line 52, "scanned" should read --detected--.

Signed and Sealed this

Twenty-third Day of March, 1993

Attest:

STEPHEN G. KUNIN

*Attesting Officer*       *Acting Commissioner of Patents and Trademarks*